United States Patent
Wang

(10) Patent No.: US 10,944,349 B2
(45) Date of Patent: Mar. 9, 2021

(54) MULTI-INVERTER ELECTRONIC MOTOR CONTROLLER

(71) Applicant: JING-JIN ELECTRIC TECHNOLOGIES CO., LTD., Beijing (CN)

(72) Inventor: Zifu Wang, Beijing (CN)

(73) Assignee: JING-JIN ELECTRIC TECHNOLOGIES CO., LTD., Beijing (CN)

(*) Notice: Subject to any disclaimer, the term of this patent is extended or adjusted under 35 U.S.C. 154(b) by 0 days.

(21) Appl. No.: 16/311,889

(22) PCT Filed: Sep. 8, 2017

(86) PCT No.: PCT/CN2017/101045
§ 371 (c)(1),
(2) Date: Dec. 20, 2018

(87) PCT Pub. No.: WO2019/033478
PCT Pub. Date: Feb. 21, 2019

(65) Prior Publication Data
US 2020/0259438 A1    Aug. 13, 2020

(30) Foreign Application Priority Data

Aug. 17, 2017   (CN) .......................... 201721037146.9

(51) Int. Cl.
*H02P 27/04*    (2016.01)
*H02P 23/28*    (2016.01)
*H02M 7/5387*   (2007.01)

(52) U.S. Cl.
CPC .......... *H02P 23/28* (2016.02); *H02M 7/5387* (2013.01)

(58) Field of Classification Search
CPC ........... H02P 27/06; H02P 29/032; H02P 6/28
See application file for complete search history.

(56) References Cited

U.S. PATENT DOCUMENTS

| 2012/0013283 A1 | 1/2012 | Tallam et al. |
| 2016/0204728 A1* | 7/2016 | Notohara ............... B60L 15/02 62/498 |
| 2019/0267982 A1* | 8/2019 | Charpentier ..... H03K 17/04206 |

FOREIGN PATENT DOCUMENTS

| CN | 101359896 A | 2/2009 |
| CN | 102340280 A | 2/2012 |

(Continued)

OTHER PUBLICATIONS

PCT International Search Report and Written Opinion issued in PCT International Application No. PCT/CN2017/101045, filed Aug. 9, 2017.

(Continued)

*Primary Examiner* — Karen Masih
(74) *Attorney, Agent, or Firm* — Perry + Currier

(57) ABSTRACT

The present disclosure discloses a multi-inverter electric motor controller, which solves the technical problem that the existing inverter with silicon-based devices cannot accurately modulate high-frequency currents. The multi-inverter electric motor controller comprises a primary inverter and one or more secondary inverters, where the primary inverter and the secondary inverters connect in parallel to a same electrical motor, the primary inverter employs silicon-material power electronic devices, the secondary inverters employ wide-bandgap semiconductor power electronic devices, and the switching frequency of the primary inverter is less than the switching frequencies of the secondary inverters. According to the present disclosure, the existing inverter with silicon-based devices and the inverters with wide-bandgap semiconductor devices are connected in parallel, and can complete the fine control of the harmonic waves of high-frequency currents.

9 Claims, 1 Drawing Sheet

(56) References Cited

FOREIGN PATENT DOCUMENTS

| CN | 102468766 A | | 5/2012 |
|---|---|---|---|
| CN | 104167907 A | | 11/2014 |
| JP | 2014183105 A | * | 9/2014 |
| WO | WO-2014085591 A2 | | 6/2014 |
| WO | WO-2015113642 A1 | | 8/2015 |

OTHER PUBLICATIONS

Biela, Juergen, et al. "SiC versus Si—Evaluation of potentials for performance improvement of inverter and DC-DC converter systems by SiC power semiconductors." IEEE transactions on industrial electronics 58.7 (2011): 2872-2882.

\* cited by examiner

MULTI-INVERTER ELECTRONIC MOTOR CONTROLLER

TECHNICAL FIELD

The present disclosure relates to electric motor controller, and particularly relates to two-inverter and multi-inverter control system for alternating current motor application.

BACKGROUND ART

Common alternating current (AC) motors, such as synchronous motors, asynchronous motors and switched reluctance motors, all need three-phase or poly-phase alternating current to function normally. Because energy sources are often in the form of direct current (DC), AC motors need inverters to pair and drive. Furthermore, even when AC source of fixed frequency such as electrical grid is directly available, in order to control speed and torque of electrical motors, AC source of fixed frequency is usually converted into DC by rectifier first, and then modulated to controllable AC by inverter. Therefore, inverter is commonly used in AC motor control system.

In state-of-the-art mass-production inverters, nearly all power electronic devices are based on silicon material (high-purity silicon), such as field effect transistors FETs (like IGBT and MOSFET) and diodes that employ silicon. However, because of the material characteristics of silicon, generally such inverters cannot sustain very high switching frequencies, otherwise the severe losses and heating, reduce efficiency of the system and even permanently damages the inverters.

Because of the limitation on switching frequency, the output current's frequency is also restricted. Given Pulse Width Modulation (PWM)'s control principle, power electronic devises' switching frequency must be at least several times higher than target output frequency, to ensure the quality of the modulated current. Therefore, inverters with silicon devices cannot accurately control the harmonic waves of very high-frequency currents. For example, currently in electric and hybrid vehicles, the switching frequency of motor controller based on silicon device is usually limited to about 12 kHz, and suffer from reduced efficiency when working close to this limit. Thus when rotational speed of a permanent magnet synchronous motor is too high, sometimes it is required to abandon the space vector control method, and conduct "six-step direction changing method", which has lower requirement on switching frequency. The latter, however, brings the primary disadvantages of higher electrical motor losses, vibrations and noises.

Power electronic devices based on wide-bandgap semiconductor materials, such as field effect transistors and diodes that employ silicon carbide (SiC) and gallium nitride (GaN), are known as the next generation of replacement for silicon devices due to their better electrical and thermal performance. Inverters built with wide-bandgap semiconductor devices, can sustain switching frequencies several times or even higher of those of the existing silicon devices, which allows more accurately controlled and modulated harmonic waves of high-frequency currents. However, presently, the disadvantage of wide-bandgap semiconductor devices is high cost, and they cannot replace silicon devices on a large scale in a short period of time.

SUMMARY OF THE DISCLOSURE

Due to the above problems in the prior art, the present disclosure provides a multi-inverter control system design, which integrates the existing inverter with silicon device and the inverter with wide-bandgap semiconductor devices. This design allows more accurately controlled high frequency currents by adding subsidiary parallel inverters, and in the meantime "zero modification" or "slight modification" on the existing mass produced silicon device inverters.

To achieve the above objects, the technical solutions of the present disclosure are realized as follows:

The present disclosure provides a multi-inverter electric motor controller, wherein, the multi-inverter electric motor controller comprises a primary inverter and one or more secondary inverters, the primary inverter and the secondary inverters connect in parallel to a same electrical motor, the primary inverter employs silicon-material power electronic devices, the secondary inverters employ wide-bandgap semiconductor power electronic devices, and the switching frequency of the primary inverter is less than the switching frequencies of the secondary inverters.

Preferably, the primary inverter comprises a power electronic device that uses a silicon material, and the secondary inverters comprise a power electronic device that uses a silicon carbide or gallium nitride material.

Preferably, the power electronic device in the primary inverter comprises an IGBT, MOSFET, diode or device module that is based on a silicon material, and the power electronic device in the secondary inverters comprises a field effect transistor, diode or device module that is based on a silicon carbide material, or a transistor or diode that is based on a gallium nitride material.

Preferably, the amplitude of the output currents from the primary inverter is greater than that from the secondary inverters.

Preferably, the primary inverter is used to modulate a low-frequency current that is equal to or below 10 kHz, and the secondary inverters are used to modulate a high-frequency current above the output frequency of the primary inverter.

Preferably, each output phase of the secondary inverters connects in series to an inductor and subsequently connects in parallel to an output phase of the primary inverter.

Preferably, both of phase numbers of the primary inverter and the secondary inverters are the same as the phase number of the electrical motor.

Preferably, the primary inverter and the secondary inverters are provided therein with bridge arms, each of which corresponds to one phase.

Preferably, housings of the primary inverter and the secondary inverters are separately provided, or manufactured integrally, or separately provided and then assembled together.

The multi-inverter electric motor controller, which employs the above structure configurations, has the following advantages:

The two or more inverters in the present disclosure can work simultaneously, and together achieve the combined output of larger currents and larger powers.

The power electric devices that are employed by the two or more inverters in the present disclosure have different types, and therefore have different best operating conditions. Therefore, under the predetermined requirement on the operating condition, software may be used to select the inverter of the better efficiency to conduct the primary output, thereby improving the overall efficiency of the system.

The secondary inverters can also generator harmonic wave to correct the output from the primary inverter, or to reduce electric motor's noise and vibration.

For example, when the electrical motor has a high rotational speed (for example, greater than 6000 RPM), in order to ensure the efficiency of the system, the primary inverter can stop using the space vector controlling method, and instead applies the "six-step direction changing method". At this point, the output current from the primary inverter contains a fundamental wave and many higher harmonic waves. With the present disclosure, we can use the secondary inverters to modulate harmonic waves with equal amplitude and 180 degrees phase difference to counteract the harmonic waves, and rectify the current waveform that is outputted into the electrical motor. That can improve the efficiency of the electrical motor, and decrease vibration and noise.

Figure 1:
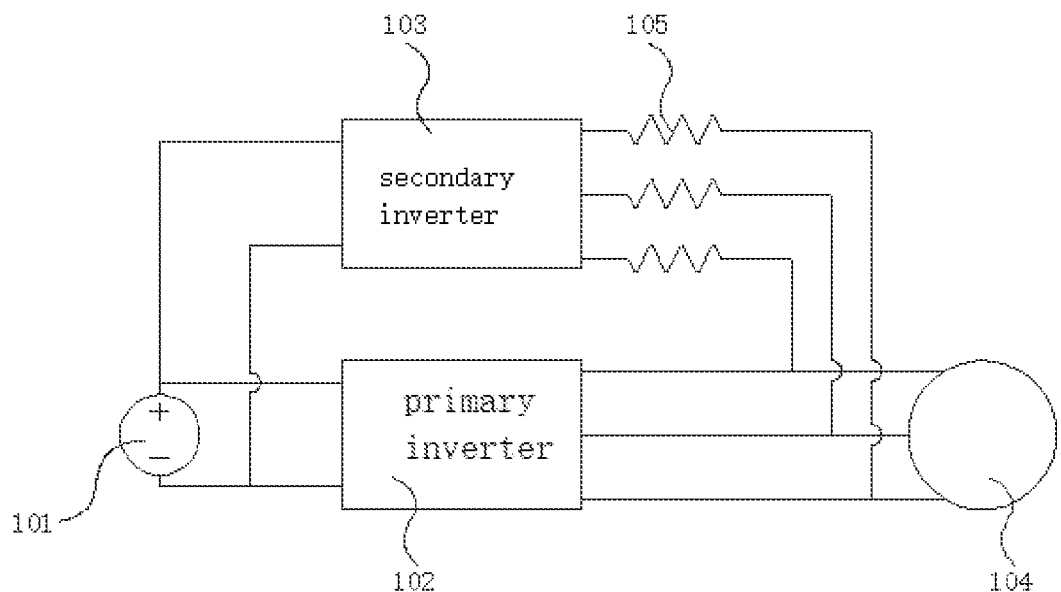
FIG. 1 is the circuit diagram of the first embodiment of the present disclosure.

In the drawings: 101. direct current voltage source; 102. primary inverter; 103. secondary inverter; 104. electrical motor; 105. buffer inductor; 106. secondary inverter; and 107. buffer inductor.

DETAILED DESCRIPTION

In order to make the objects, the technical solutions and the advantages of the present disclosure clearer, the embodiments of the present disclosure will be described below in further detail in conjunction with the drawings.

The First Embodiment

FIG. 1 shows the first embodiment of the present disclosure. In the present embodiment, a multi-inverter electric motor controller comprises a primary inverter 102 and a secondary inverter 103. The primary inverter 102 and the secondary inverter 103 connect in parallel to a same electrical motor 104, and in the present embodiment the electrical motor 104 is a three-phase alternating-current motor. The primary inverter 102 is used to modulate low-frequency currents, and the secondary inverter 103 is used to modulate high-frequency currents.

The switching frequency of the primary inverter 102 is less than that of the secondary inverter 103.

The direct current voltage source 101 shown by FIG. 1 is a direct current to be modulated, and both of the input ends of the primary inverter 102 and the secondary inverter 103 connect to the direct current voltage source 101.

The primary inverter 102 employs silicon material (high-purity silicon) power electronic devices, and the secondary inverter 103 employs wide-bandgap semiconductor power electronic devices. Accordingly, the primary inverter 102 can be used to modulate currents of low frequencies and high amplitudes, and the secondary inverter 103 is used to modulate currents of high frequencies and low amplitudes.

For example, the primary inverter 102 comprises power electronic devices of a silicon material, such as IGBT, MOSFET, diode or device module that is based on silicon material.

IGBT refers to Insulated Gate Bipolar Transistor.

MOSFET refers to Metal-Oxide-Semiconductor Field-Effect Transistor.

For example, the secondary inverter 103 comprises power electronic devices of a silicon carbide or gallium nitride material, such as field effect transistor, diode or device module that is based on a silicon carbide material, or a transistor or diode that is based on a gallium nitride material.

The present embodiment prevents the defects that the primary inverter 102 has severe losses and heating, which affects the efficiency of the system and generates high vibration, noise and damages the products.

In the present embodiment, the amplitude value of the current that is outputted by the primary inverter 102 is greater than that by the secondary inverter 103.

The primary inverter 102 is used to modulate low-frequency currents that are equal to or below 10 kHz, and the secondary inverter 103 is used to modulate high-frequency currents above the output frequency of the primary inverter.

A control software of the electric motor controller selects the primary inverter 102 or the secondary inverter 103 to modulate according to currents of different operating conditions. For example, when currents of low frequencies and high amplitude values are required to be modulated, the primary inverter 102 is started up; when currents of high frequencies and low amplitude values are required to be modulated, the secondary inverter 103 is started up; and when currents of low frequencies and of high frequencies are simultaneously required, the primary inverter 102 and the secondary inverter 103 are started up together to cooperatively modulate.

The current output end of each phase of the secondary inverter 103 connects in series to a buffer inductor 105 and subsequently connects in parallel to the current output end of the primary inverter 102. If the current output end of the secondary inverter 103 directly connects to the current output end of the primary inverter 102, that easily causes the short circuit of the internal devices, and the connection in series of the buffer inductor 105 can prevent that phenomenon.

Both of the phase numbers of the primary inverter 102 and the secondary inverter 103 are the same as that of the electrical motor 104.

The primary inverter 102 and the secondary inverter 103 are provided therein with bridge arms, each of which corresponds to one phase (that is, a half-bridge circuit), so they each have 3 bridge arms.

The housings of the primary inverter 102 and the secondary inverter 103 may be separately provided, or manufactured integrally, or separately provided and then assembled together.

The Second Embodiment

Figure 2:
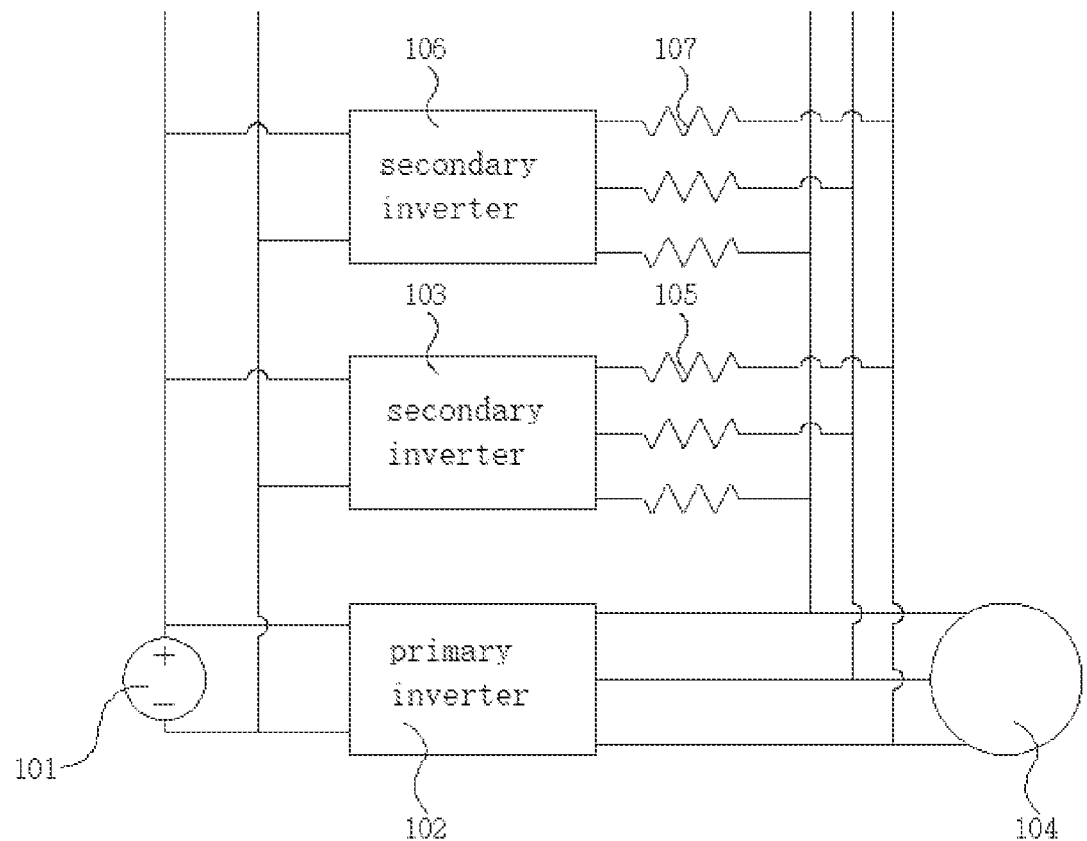
FIG. 2 is the circuit diagram of the second embodiment of the present disclosure.

FIG. 2 shows the second embodiment of the present disclosure. In the present embodiment, what is different from the first embodiment is that, a multi-inverter electric motor controller comprises a primary inverter 102 and two secondary inverters 103, 106, the primary inverter 102 and the secondary inverters 103, 106 connect in parallel to a same electrical motor 104, the primary inverter 102 is used to modulate low-frequency currents, and the secondary inverters 103, 106 are used to modulate high-frequency currents.

The secondary inverter 103 and the secondary inverter 106 have different working parameters, and both of them can modulate currents of high frequencies and low amplitudes, and a control software of the electric motor controller selectively starts up the secondary inverter 103 or the secondary inverter 106 according to currents of different operating conditions.

The current output end of each phase of the secondary inverter 103 connects in series to a buffer inductor 105 and subsequently connects in parallel to the current output end of the primary inverter 102, and the current output end of each phase of the secondary inverter 106 connects in series to a buffer inductor 107 and subsequently connects in parallel to the current output end of the primary inverter 102.

The present embodiment may also provide more than two secondary inverters, and the connections between the secondary inverters and between them and the primary inverter 102 are all connections in parallel, the particular structures of which are not particularly described here.

The housings of the plurality of secondary inverters may be separately provided, or manufactured integrally, or separately provided and then assembled together.

The housings of the plurality of secondary inverters and the housing of the primary inverter 102 may be separately provided, or manufactured integrally, or separately provided and then assembled together.

The other structures of the multi-inverter electric motor controller in the present embodiment is the same as that in the first embodiment, and will not be described repeatedly here.

The above are only special embodiments of the present disclosure. By the teaching of the present disclosure, a person skilled in the art can make other modifications or variations on the basis of the above embodiments. A person skilled in the art should appreciate that, the above special descriptions are only for the purpose of better explaining the present disclosure, and the protection scope of the present disclosure should be subject to the protection scope of the claims.

What is claimed is:

1. A multi-inverter electric motor controller, wherein, the multi-inverter electric motor controller comprises a primary inverter and one or more secondary inverters, the primary inverter and the secondary inverters connect in parallel to a same electrical motor, the primary inverter employs silicon-material power electronic devices, the secondary inverters employ wide-bandgap semiconductor power electronic devices, and switching frequency of the primary inverter is less than the switching frequencies of the secondary inverters; and the two or more inverters can work simultaneously, and together achieve combined output of larger currents and larger powers.

2. The multi-inverter electric motor controller according to claim 1, wherein, the primary inverter comprises power electronic devices that use a silicon material, and the secondary inverters comprise power electronic devices that use a silicon carbide or gallium nitride material.

3. The multi-inverter electric motor controller according to claim 2, wherein, the power electronic devices in the primary inverter comprises IGBT, MOSFET, diode or device module that is based on silicon material, and the power electronic devices in the secondary inverters comprises field effect transistor, diode or device module that is based on silicon carbide material, or transistor or diode that is based on a gallium nitride material.

4. The multi-inverter electric motor controller according to claim 1, wherein, amplitude of currents outputted by the primary inverter is greater than those by the secondary inverters.

5. The multi-inverter electric motor controller according to claim 1, wherein, the primary inverter is used to modulate a low-frequency current that is equal to or below 10 kHz, and the secondary inverters are used to modulate a high-frequency current above output frequency of the primary inverter.

6. The multi-inverter electric motor controller according to claim 1, wherein, each output phase of the secondary inverters connects in series to an inductor and subsequently connects in parallel to an output phase of the primary inverter.

7. The multi-inverter electric motor controller according to claim 1, wherein, both of phase numbers of the primary inverter and the secondary inverters are the same as the phase number of the electrical motor.

8. The multi-inverter electric motor controller according to claim 7, wherein, the primary inverter and the secondary inverters are provided therein with bridge arms, each of which corresponds to one phase.

9. The multi-inverter electric motor controller according to claim 1, wherein, housings of the primary inverter and the secondary inverters are separately provided, or manufactured integrally, or separately provided and then assembled together.

* * * * *